(12) United States Patent
Muttik et al.

(10) Patent No.: US 9,384,148 B2
(45) Date of Patent: Jul. 5, 2016

(54) DETECTION OF UNAUTHORIZED MEMORY MODIFICATION AND ACCESS USING TRANSACTIONAL MEMORY

(71) Applicant: Intel Corporation, Santa Clara, CA (US)

(72) Inventors: Igor Muttik, Aylesbury (GB); Roman Dementiev, Heidelberg (DE); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 14/367,989

(22) PCT Filed: Dec. 17, 2013

(86) PCT No.: PCT/US2013/075805
§ 371 (c)(1),
(2) Date: Jun. 23, 2014

(87) PCT Pub. No.: WO2015/094189
PCT Pub. Date: Jun. 25, 2015

(65) Prior Publication Data
US 2016/0026581 A1 Jan. 28, 2016

(51) Int. Cl.
*G06F 21/14* (2013.01)
*G06F 12/14* (2006.01)
*G06F 21/60* (2013.01)

(52) U.S. Cl.
CPC ............ *G06F 12/14* (2013.01); *G06F 12/1441* (2013.01); *G06F 21/60* (2013.01)

(58) Field of Classification Search
CPC ............ G06F 12/0802; G06F 12/0808; G06F 12/0891; G06F 12/14; G06F 12/1416; G06F 12/1441; G06F 21/50; G06F 21/52–21/54; G06F 21/56; G06F 21/563; G06F 21/566; G06F 21/57; G06F 21/577; G06F 21/60
See application file for complete search history.

(56) References Cited

U.S. PATENT DOCUMENTS

| 7,231,498 B2 * | 6/2007 | Rodeheffer | ............. G06F 9/526 711/150 |
| 7,908,656 B1 | 3/2011 | Mu | |

(Continued)

OTHER PUBLICATIONS

Wikipedia, "Transactional Synchronization Extensions," [Online] Web page <https://en.wikipedia.org/wiki/Transactional_Synchronization_Extensions>, 2 pages, Sep. 17, 2012 [Retrieved on: Feb. 10, 2016], Retrieved from: Internet Archive Wayback Machine <https://web.archive.org/web/20120615000000*/https://en.wikipedia.org/wiki/Transactional_Synchronization_Extensions>.*

(Continued)

*Primary Examiner* — Eric W Shepperd
(74) *Attorney, Agent, or Firm* — Barnes & Thornburg LLP

(57) ABSTRACT

Technologies for detecting unauthorized memory accesses include a computing device having transactional memory support. The computing device executes a code segment identified as suspicious and detects a transactional abort during execution of the code segment. The computing device may execute a security support thread concurrently with the code segment that reads one or more monitored memory locations. A transactional abort may be caused by a read of the security support thread conflicting with a write from the code segment. The computing device may set a breakpoint within the code segment, and a transactional abort may be caused by execution of the code segment reaching the breakpoint. An abort handler determines whether a security event has occurred and reports the security event. The abort handler may determine whether the security event has occurred based on the cause of the transactional abort. Other embodiments are described and claimed.

15 Claims, 4 Drawing Sheets

(56) References Cited

U.S. PATENT DOCUMENTS

| | | | | |
|---|---|---|---|---|
| 8,327,188 | B2* | 12/2012 | Karlsson | G06F 11/1405 714/15 |
| 8,474,039 | B2* | 6/2013 | Sallam | G06F 21/566 726/22 |
| 8,682,877 | B2* | 3/2014 | Greiner | G06F 9/467 707/703 |
| 8,688,661 | B2* | 4/2014 | Greiner | G06F 9/467 707/703 |
| 8,887,002 | B2* | 11/2014 | Greiner | G06F 9/30058 712/234 |
| 2007/0240158 | A1* | 10/2007 | Chaudhry | G06F 9/52 718/102 |
| 2007/0260942 | A1* | 11/2007 | Rajwar | G06F 9/526 714/54 |
| 2007/0288646 | A1* | 12/2007 | Imamura | G06F 15/16 709/230 |
| 2008/0005193 | A1* | 1/2008 | Lev | G06F 11/3632 |
| 2009/0038008 | A1 | 2/2009 | Pike | |
| 2009/0049250 | A1* | 2/2009 | Resnick | G11C 7/1006 711/147 |
| 2010/0325630 | A1* | 12/2010 | Flood | G06F 9/466 718/101 |
| 2011/0119452 | A1* | 5/2011 | Heller, Jr. | G06F 9/467 711/147 |
| 2011/0209151 | A1 | 8/2011 | Chung et al. | |
| 2012/0047579 | A1 | 2/2012 | Ishiyama | |
| 2012/0144128 | A1* | 6/2012 | Serebrin | G06F 9/467 711/149 |
| 2013/0205119 | A1* | 8/2013 | Rajwar | G06F 9/3842 712/208 |
| 2013/0232343 | A1 | 9/2013 | Horning et al. | |
| 2013/0339675 | A1* | 12/2013 | Greiner | G06F 9/3861 712/220 |
| 2013/0339804 | A1* | 12/2013 | Greiner | G06F 11/3636 714/45 |
| 2015/0026688 | A1* | 1/2015 | Dice | G06F 9/467 718/102 |
| 2015/0052315 | A1* | 2/2015 | Ghai | G06F 9/467 711/145 |

OTHER PUBLICATIONS

Bright, Peter "Transactional memory going mainstream with Intel Haswell" [Online], Feb. 8, 2012 [Retrieved on Feb 10, 2016], www.arstechnica.com, Retrieved from: <http://arstechnica.com/business/2012/02/transactional-memory-going-mainstream-with-intel-haswell/>.*

Lourenco et al. "Detecting Concurrency Anomalies in Transactional Memory Programs" [Online], May 2011 [Retrieved on: Feb. 10, 2016], Retrieved from: < file:///C:/Users/eshepperd/Downloads/ComSIS_295-1012.pdf>.*

International Search Report and the Written Opinion for Application No. PCT/US2013/075805, dated Sep. 30, 2014, 10 pages.

* cited by examiner

DETECTION OF UNAUTHORIZED MEMORY MODIFICATION AND ACCESS USING TRANSACTIONAL MEMORY

BACKGROUND

One aspect of computer security involves protecting computer systems from malicious software, also known as "malware." Malware comes in many forms; however, many common varieties of malware perform writes or other accesses to unauthorized locations in computer memory. For example, certain malware modifies critical in-memory system data structures to gain control over a computer. One such attack involves overwriting the system call table so that code supplied by the malware is executed in place of one or more system calls. Such an attack may be used by so-called "rootkits" to gain control of a system and evade detection. As another example, some malware causes the system to execute code from unauthorized memory segments such as the system stack or data segments. For example, buffer overflow exploits, return-oriented programming (ROP) gadgets, and similar exploits cause the system to execute code from (or driven by) the system stack or heap that should not ordinarily be executed. Malware may perform such attacks to execute so-called "shellcode" attacks; that is, to execute arbitrary code (usually introduced from a remote location) on the computer system.

Typical computer security systems attempt to detect malware by applying code analysis to classify potentially malicious code. For example, a computer security system may perform static analysis of code to search for well-known malware signatures. Some systems may also perform dynamic analysis of code execution. Typical dynamic monitoring such as single-stepping execution using a hypervisor, has a large negative impact on system performance.

Some computer processors provide support for hardware transactional memory. Transactional memory allows the programmer to designate a segment of code called a "transaction" to execute independently and atomically. That is, memory operations occurring within the transaction are not visible to other transactions or threads executing on the computing system until the transaction is successfully committed. After successful commit, all memory changes made during the transaction are instantaneously available to other threads on the system. Transactional memory may be implemented by speculatively executing the transaction, detecting any memory conflicts that occur during execution of the transaction, and then aborting and rolling back the transaction in response to memory conflicts. Memory conflicts include, for example, a transaction attempting to write to a memory location that has already been read or written-to by another transaction. Transactional memory may simplify the programming model for parallel computing. One commercially available example of hardware transactional memory support is Transactional Synchronization Extensions (Intel® TSX), available on certain processors manufactured by Intel® Corporation.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
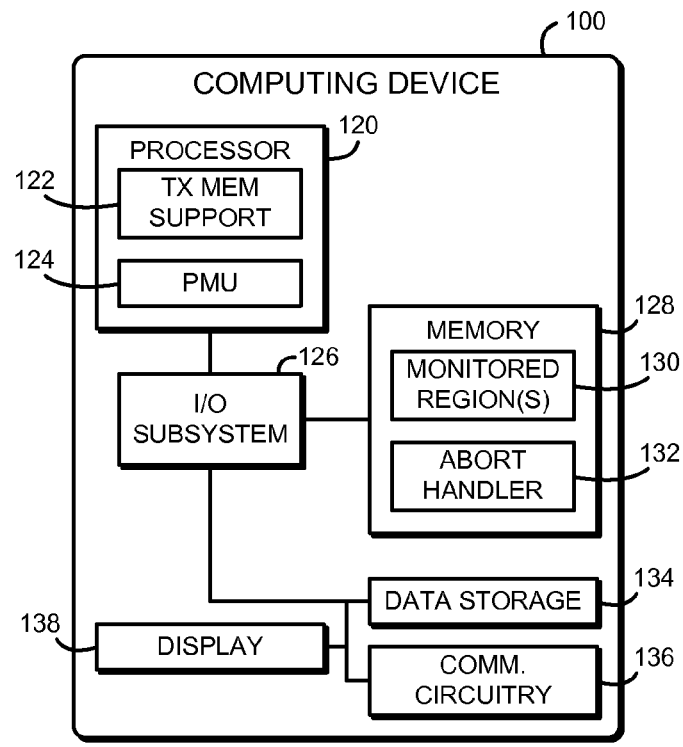
FIG. 1 is a simplified block diagram of at least one embodiment of a computing device for detection of unauthorized memory access.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 may be used for detection of unauthorized memory access. The computing device 100 may identify a segment of suspicious code that may contain malware. Prior to executing the suspicious code, the computing device 100 wraps the suspicious code in a transactional envelope. Additionally, the computing device 100 may set a breakpoint at a particular location within the suspicious code. The computing device 100 subsequently executes the transactional envelope and, if the suspicious code performs unauthorized memory accesses such as writing to a particular memory region or executing the code at the breakpoint (that has, for example, been placed into a suspected shellcode or into a suspected gadget used in a sequence of return-oriented programming gadgets or in a chain of jump-oriented programming gadgets), the transaction is aborted and rolled back. If the transaction completes successfully, then computing device 100 determines that neither an unauthorized memory access occurred nor execution reached the breakpoint. Transactional execution of the suspicious code allows the computing device 100 to dynamically monitor the behavior of the suspicious code without significantly negatively impacting performance. By significantly improving performance of malware detection, computer security may be improved. Additionally, transactional execution may be managed by hardware of the computing device 100 and thus may be inaccessible to malware, protecting the malware detection process itself from malware.

The computing device 100 may be embodied as any type of device for performing the functions described herein. For example, the computing device 100 may be embodied as, without limitation, a desktop computer, a server computer, a workstation, a laptop computer, a notebook computer, a mobile computing device, a smart phone, a tablet computer, a cellular telephone, a handset, a messaging device, a wearable computing device, a vehicle telematics device, a distributed computing system, a multiprocessor system, a consumer electronic device, an embedded controller, and/or any other computing device configured to perform the functions described herein. As shown in FIG. 1, the illustrative computing device 100 includes a processor 120, an input/output subsystem 126, a memory 128, and a data storage device 134. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments (e.g. in implementations where the processor cache is used as random-access memory).

The processor 120 may be embodied as any type of processor capable of performing the functions described herein. For example, the processor 120 may be embodied as a single or multi-core processor(s), digital signal processor, microcontroller, or other processor or processing/controlling circuit. Although the illustrative computing device 100 includes a single processor 120, in some embodiments the computing device 100 may include more than one processor 120. For example, the computing device 100 may be embodied as a symmetric multiprocessing system with shared memory interconnects. The illustrative processor 120 includes hardware transactional memory support 122 and a performance monitoring unit (PMU) 124.

The transactional memory support 122 allows the processor 120 to speculatively execute segments of code known as transactions. Transactions are atomic, meaning that memory operations performed by a transaction while the transaction is pending are not visible to other transactions, logical processors, and/or threads of the processor 120. When a transaction is completed, also known as committed, all of the memory operations of the transaction become available to the rest of the computing device 100 at once. When memory accesses within a transaction conflict with another transaction or thread, for example when a thread attempts to read a memory location that has been written by an uncommitted transaction (or when two transactions and/or threads write to the same memory location), the processor 120 may abort the conflicting transaction(s), discarding any associated in-progress transactional memory changes. The processor 120 may detect conflicting memory locations at any level of granularity, for example per cache line, per word, or per memory cell. On abort, the processor 120 may call an abort handler, restart the transaction (once or multiple times), or invoke non-transactional fallback code in response to an aborted transaction. In some embodiments, the transactional memory support 122 may be embodied as Intel® Transactional Synchronization Extensions (Intel® TSX), available on certain processors 120 manufactured by Intel® Corporation.

The PMU 124 may be embodied as a number of performance counters capable of recording and monitoring the flow of instructions through the processor 120. For example, the PMU 124 may be capable of reporting the precise memory address of an instruction causing a transactional abort (e.g., an explicit abort instruction or a breakpoint) or the memory address of a conflicting data location. Although illustrated as a single PMU 124, in some embodiments the processor 120 may include several PMUs 124, for example one PMU 124 for each processor core.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The illustrative memory 128 includes one or more monitored regions 130 and an abort handler 132. As described further below, the monitored regions 130 are specific regions of memory monitored for attempted unauthorized memory access. Such monitored regions 130 may include critical system memory structures such as the system call table, hardware interrupts table, system security software, or other important memory regions. The abort handler 132 may include a routine or routines that are called in the event of a transactional abort to handle potential security violations, as described further below. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. The data storage device 134 may be used to store software or other data for execution including operating system software and application software. Such software may be initially untrusted and potentially malicious, for example, software downloaded from a third party vendor.

The computing device 100 further includes a communication circuit 136, which may be embodied as any communication circuit, device, or collection thereof, capable of enabling communications between the computing device 100 and remote computing devices. The communication circuit 136 may be configured to use any one or more communication technology (e.g., wireless or wired communications) and associated protocols (e.g., Ethernet, Bluetooth®, Wi-Fi®, WiMAX, HSPA+, LTE, etc.) to effect such communication. The communication circuit 136 may be embodied as a network adapter, including a wireless network adapter.

In the illustrative embodiment, the computing device 100 further includes a display 138. The display 138 of the computing device 100 may be embodied as any type of display capable of displaying digital information such as a liquid crystal display (LCD), a light emitting diode (LED), a plasma display, a cathode ray tube (CRT), or other type of display device. The display 138 may be used, for example, to convey results of security analysis to a user.

Figure 2:
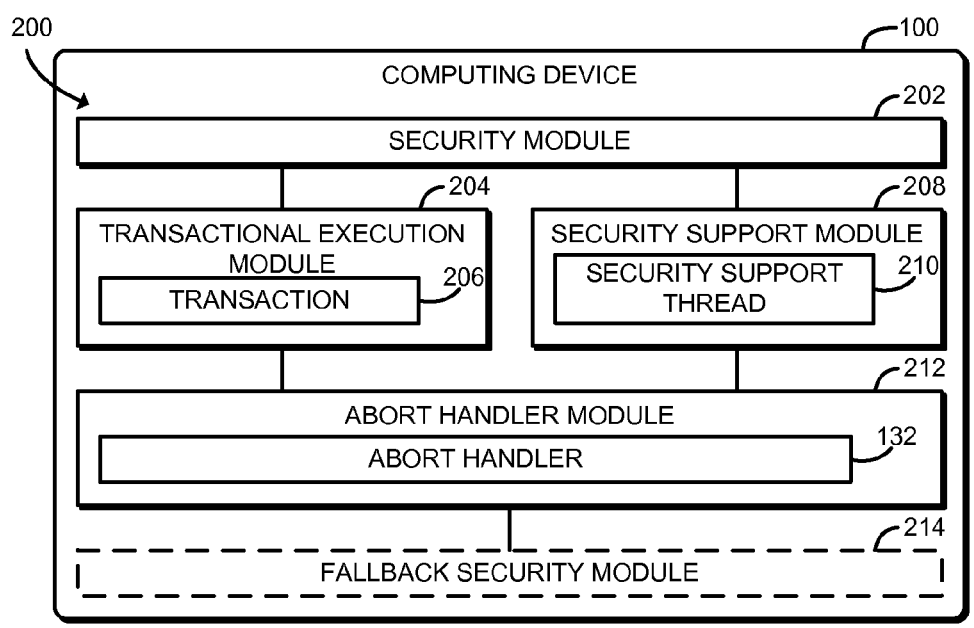
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a security module 202, a transactional execution module 204, a security support module 208, and an abort handler module 212. In some embodiments, the environment 200 may also include a fallback security module 214. The various modules of the environment 200 may be embodied as hardware, firmware, software, or a combination thereof.

The security module 202 is configured to identify a suspicious code segment and wrap the suspicious code segment in a transactional execution envelope. The security module 202 may also be configured to identify particular memory locations within the suspicious code that should not be executed, for example suspected shellcode or suspected return-oriented programming (ROP) gadgets. Thus the security module 202 may be embodied as any component of the computing device 100 having access to the address space of the suspicious code (or to the image of the code on data storage 134 before the code is mapped into memory 128). For example, the security module 202 may be embodied as or part of a virtual machine monitor (VMM), hypervisor, operating system, kernel software, or other control system of the computing device 100.

The transactional execution module 204 is configured to execute the suspicious code within the transactional envelope and to detect any transactional aborts that occur during execution of the suspicious code. The transactional execution module 204 is configured to manage execution of a transaction 206, which includes the suspicious code. Transactional aborts may occur when the suspicious code attempts to modify a monitored memory region 130, when the suspicious code attempts to execute unauthorized code, or for other reasons unrelated to security violations (e.g., a data conflict unrelated to the monitored memory regions 130, an incompatible instruction encountered during transactional execution, a transactional buffer capacity exceeded, an I/O instruction encountered, etc.).

The security support module 208 is configured to execute a security support thread 210 concurrently with transactional execution of the transaction 206. The security support thread 210 is configured to ensure that a transactional abort is triggered if the suspicious code attempts to write to any of the monitored regions 130. The particular operations required to trigger a transactional abort may depend on the particular embodiment of the transactional memory support 122 of the computing device 100. For example, in some embodiments, the security support thread 210 may be configured to repeatedly access (e.g., read) all of the monitored regions 130 in a loop, forcing a memory conflict if the transaction 206 writes (or attempts to write) to any of the monitored regions 130.

The abort handler module 212 is configured to determine whether a transactional abort detected during execution of the suspicious code was caused by a security event caused by the suspected transaction 206. To do so, the abort handler module 212 may analyze device state of the computing device 100 and/or the processor 120 to determine the cause of the transactional abort (e.g., an explicit abort, reaching a breakpoint, or a memory conflict) and the address of any conflicting data location. The abort handler module 212 is also configured to report detected security events so that an appropriate response may be generated. The abort handler module 212 may include the abort handler 132, which may be embodied as a software routine called automatically by the processor 120 in response to detection of a transactional abort. If the abort handler module 212 determines that the reason for abort event was not caused by unauthorized action of transaction 206 then transactional execution may be repeated once or multiple times.

Some embodiments may include the fallback security module 214, which may be configured to perform non-transactional malware monitoring and/or detection. For example, the fallback security module 214 may perform static analysis, single-step dynamic memory access analysis, or any other known malware detection method. The fallback security module 214 may be invoked by the abort handler module 212 when the suspicious code cannot be completed transactionally but no security events have been detected. For example, the fallback security module 214 may be invoked for suspicious code containing instructions incompatible with transactional execution. The fallback security module 214 is likely to be significantly slower than transactional detection; thus, it is preferred only as a fallback slow-path if transactional detection is unsuccessful.

Figure 3:
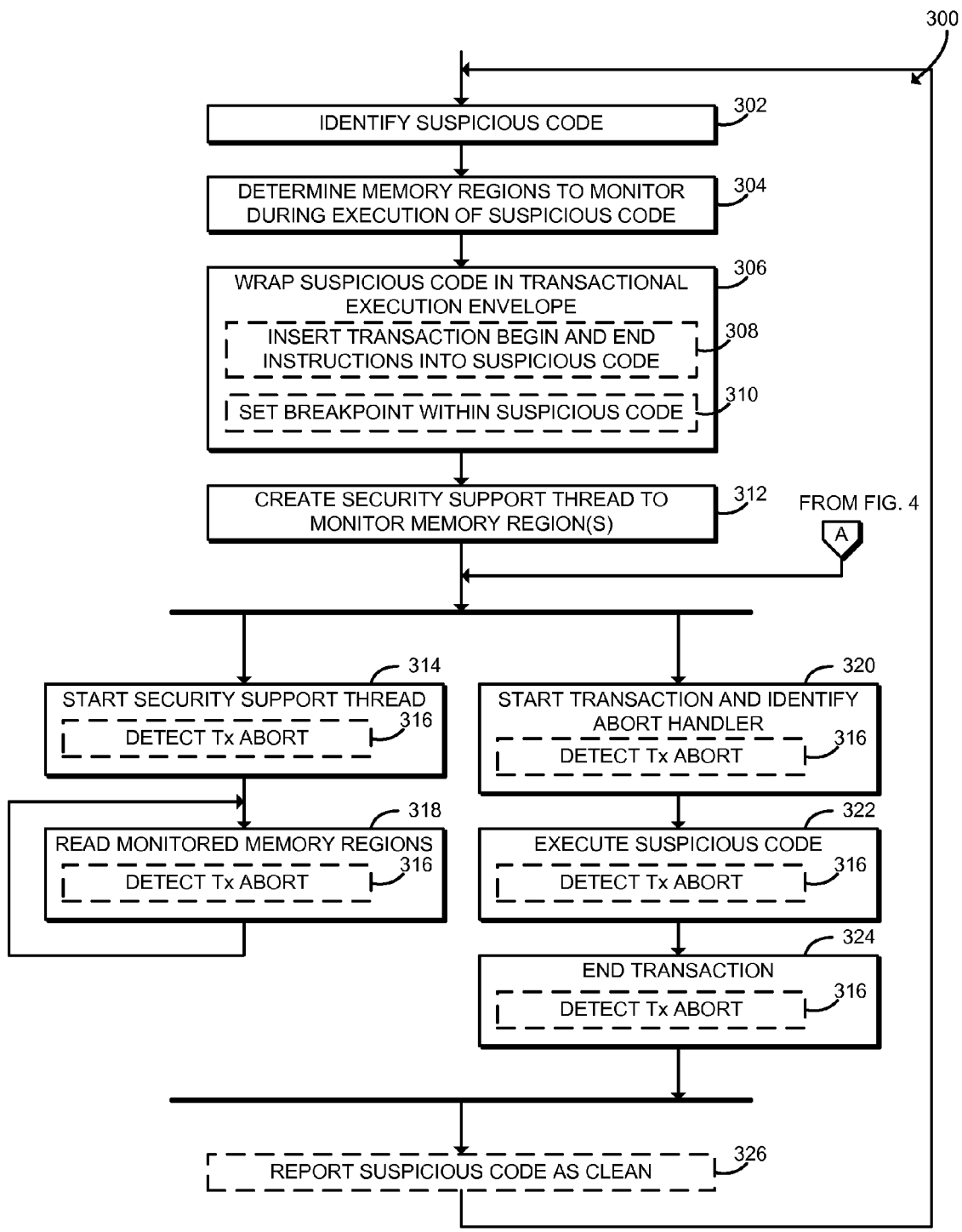
FIG. 3 is a simplified flow diagram of at least one embodiment of a method for detecting unauthorized memory access that may be executed by the computing device of FIGS. 1 and 2.

Referring now to FIG. 3, in use, the computing device 100 may execute a method 300 for detecting unauthorized memory accesses. The method 300 begins in block 302, in which the computing device 100 identifies a segment of suspicious code. The computing device 100 may use any method to identify the suspicious code. For example, in some embodiments the computing device 100 may identify as suspicious any code that is to be executed. In some embodiments, the computing device 100 may identify suspicious code based on metadata attributes such as whether the code is signed, whether the code was downloaded from the Internet, and so on. Additionally or alternatively, the computing device 100 may perform static analysis, dynamic analysis (e.g., based on emulation), or other heuristic analysis to identify potentially malicious code.

In block 304, the computing device 100 determines one or more memory regions 130 to monitor during execution of the suspicious code. The monitored regions 130 may be embodied as any important in-memory data structure or address range that should not be modified by the suspicious code. For example, the monitored regions 130 may include the system call table or other system-level or kernel-level data structures or code areas (e.g., to protect OS code from being patched or modified). Additionally or alternatively, the monitored regions 130 may include memory addresses within the suspicious code segment that should not be executed. For example, the suspicious code may include a data segment that should not be executed; execution of that data segment may indicate a buffer overflow or other potentially malicious exploit. In that example, the data segment may be included in the monitored memory regions 130. As further described below, such monitored memory regions 130 that should not be executed may be monitored through the use of a breakpoint or explicit abort instruction.

In block 306, the computing device 100 wraps the suspicious code in a transactional execution envelope. Wrapping the suspicious code allows the suspicious code to be executed in a transaction. Any method for wrapping the suspicious code compatible with the transactional memory support 122 of the processor 120 may be used. In some embodiments, in block 308 the computing device 100 may insert transaction-begin and transaction-end instructions into or around the suspicious code, for example by using a hypervisor to execute corresponding instructions in the context of the suspicious code or using an instrumentation. In some embodiments, the inserted instructions may be made invisible to the suspicious code. The transaction-begin and transaction-end instructions may be embodied as machine instructions interpreted by the processor 120 to signal the beginning and end of a transaction, respectively. For example, on Intel® architecture processors with Intel® Transactional Synchronization Extensions (Intel® TSX), the transaction begin and transaction end instructions may be embodied as instructions having the mnemonics XBEGIN and XEND, respectively.

In some embodiments, in block 310 the computing device 100 may set a breakpoint or an explicit abort instruction within the suspicious code. The breakpoint may be set for a monitored memory region 130 within the suspicious code that the computing device 100 has determined should not be executed. The breakpoint may be embodied as any instruction, data, or other setting that causes the processor 120 to generate a transactional abort when attempting to execute that particular location in memory. For example, the breakpoint may be set by inserting an explicit transaction abort instruction, such as an instruction having the mnemonic XABORT on Intel® architecture processors with Intel® TSX. Additionally or alternatively, the breakpoint may be set by inserting any other suitable instruction or set of instructions that causes a transaction abort (e.g., a breakpoint interrupt instruction, an illegal instruction, or a sequence of instructions causing overflow of internal CPU transaction-tracking storage resulting in an abort). Additionally or alternatively, the breakpoint may be set by storing a particular value in a debug register of the processor 120. Setting the breakpoint may allow the computing device 100 to monitor for execution of a potentially malicious location within the suspicious code.

In block 312, the computing device 100 creates a security support thread 210 that may be used to monitor the monitored memory regions 130. The security support thread 210 may be embodied as any independent thread of execution runnable on a logical processor of the computing device 100, such as an operating system thread, a lightweight process, an operating system process, operating system kernel thread, or a user software thread. On creation, the security support thread 210 may be supplied with the addresses of the monitored regions 130. In some embodiments, rather than being newly created the security support thread 210 may be selected from a thread pool or otherwise prepared for use. Of course, it should be noted that in some embodiments, actions corresponding to the creation or activation of the security support thread 210 may be performed at any time, including prior to execution the method 300.

After creating the security support thread 210 in block 312, the method 300 advances concurrently to blocks 314, 320. The computing device 100 may use any concurrency technique to execute the method 300. For example, the computing device 100 may execute the method 300 concurrently on multiple processor cores, logical processors, or hardware threads of the processor 120, concurrently on multiple processors 120 (not shown), or time-division multiplexed on a single-core processor 120. The concurrency technique used may depend on the particular embodiment of the transactional memory support 122; for example, in some embodiments the security support thread 210 may be required to execute on a separate processor core from the transaction 206 in order to generate transactional aborts.

In block 314, the computing device 100 starts the security support thread 210. As described above, starting the security support thread 210 starts independent, concurrent execution of the security support thread 210. In block 316, the computing device 100 may detect a transactional abort generating by the processor 120. The transactional abort may be caused by a memory conflict between the security support thread 210 and any transactions executing on the computing device 100, including the transaction 206. As described above, transactional memory conflicts occur, for example, when a thread attempts to read a data location that has been written-to by a pending transaction. The detection of memory conflicts and subsequent generation of transactional aborts may be performed by hardware of the processor 120, microcode of the processor 120, firmware, software, or any combination of those techniques. Detection of memory conflicts and other transactional aborts may be transparent to software executing on the processor 120, which may become aware of a transactional abort only after the abort handler 132 is called by the processor 120. Accordingly, the processor 120 may detect transactional aborts at any time during execution of the security support thread 210. One embodiment of a method for detecting transactional aborts and an associated abort handler 132 is described further below, in connection with FIG. 4.

In block 318, the computing device 100 reads the monitored memory regions 130. Reading the monitored memory regions 130 from the security support thread 210 may cause a memory conflict with any memory writes to the monitored memory regions 130 from the transaction 206. In some embodiments, the security support thread 210 may not track any monitored memory regions 130 within the suspicious code itself; those code locations may be monitored by setting a breakpoint within the suspicious code. Accordingly, while reading the monitored memory regions 130 in block 318, in block 316 the computing device 100 may detect transactional aborts. After reading the monitored memory regions 130, the method 300 loops back to block 318 to continue reading the monitored memory regions 130.

Referring back to block 312, after creating the security support thread 210, the method 300 advances concurrently to blocks 314, 320. In block 320, the computing device 100 starts the transaction 206 and identifies the associated abort handler 132. In some embodiments, the transaction 206 may be started by executing a particular instruction, for example the XBEGIN instruction. The address of the abort handler 132 may be passed as an argument to the transaction-begin instruction. Additionally or alternatively, a separate instruction may exist for specifying address of the abort handler 132. If a transactional abort occurs during execution of the transaction 206, the processor 120 calls the abort handler 132.

While starting the transaction 206 in block 320, in block 316 the computing device 100 may detect a transactional abort, for example a transactional abort caused by a memory conflict between the transaction 206 and the security support thread 210. Of course, transactional aborts may have other causes such as exceeding hardware limits on transaction size or encountering an instruction not supported for transactional execution (e.g., an attempted I/O instruction).

In block 322, the computing device 100 executes the suspicious code within the transaction 206. Thus, the suspicious code is executed concurrently with the security support thread 210. While executing the suspicious code in block 322, in block 316 the computing device 100 may detect a transactional abort. A transactional abort may be generated if the suspicious code of the transaction 206 writes to a monitored memory region 130 that is read by the security support thread 210. The transactional abort may be generated immediately upon the conflicting write or at a later time. For example, referring now to FIG. 5, diagram 500 illustrates detection of a transactional abort that may be caused by a read-write conflict. Diagram 502 illustrates the memory 128, showing four named memory locations A, B, C, and D. Locations A and B are monitored memory regions 130. The security support thread 210 executes a stream of instructions 504 that continually read from the monitored memory locations A, B (the exact timing, order, and number of read instructions may vary). Concurrently, the transaction 206 executes a stream of instructions 506. Memory conflicts 508, 510 represent data conflicts caused by the transaction 206 writing to the monitored memory location B and the security support thread 210 reading from the monitored memory location B. As described above, a transactional abort may be generated for either conflict 508, 510. In response to the transactional abort, the transaction 206 is rolled back and the abort handler 132 is executed (see method 400 of FIG. 4). Additionally or alternatively, a transactional abort may be generated upon encountering a breakpoint previously set within the suspicious code or an explicit abort instruction inserted within the suspicious code. In the case of encountering a breakpoint or express abort instruction, memory modifications made by transaction 206 are also rolled back.

Referring back to FIG. 3, in block 324, the computing device 100 ends the transaction 206 after completion of the suspicious code. In some embodiments, the transaction 206 may be ended by executing a particular instruction, for example the XEND instruction. Ending the transaction 206 may cause the computing device 100 to validate the transaction 206 prior to committing the transaction 206. Validating the transaction 206 may include validating the read set and/or write set of the transaction 206 to determine whether any memory conflicts have occurred during execution of the transaction 206. While ending the transaction 206 in block 324, in block 316 the computing device 100 may detect a transactional abort. For example, a transactional abort may be raised upon failure to validate and/or commit the transaction 206 for any reason. Additionally or alternatively, in some embodiments, the computing device 100 may implement an "eager" validation mechanism where the validation (including conflict detection) happens as soon as possible after issuing memory requests or after encountering any abort condition. Further, in some embodiments an explicit transaction-end instruction may be absent, in which case the transaction 206 may end implicitly due to exhausting the capacity of storage used to track transactional conflicts.

After successfully ending the transaction 206, the method 300 may advance to block 326, or in some embodiments, loop back to block 302. Successful completion of the transaction 206 indicates that no security events have occurred; that is, the suspicious code did not attempt unauthorized access to any of the monitored memory regions 130, including attempted execution of suspicious code marked with breakpoints. After ending the transaction 206, execution of the method 300 may return to being single-threaded in nature. For example, the computing device 100 may stop or otherwise terminate execution of the security support thread 210 after the transaction 206 successfully commits. In some embodiments, in block 326 the computing device 100 may report the suspicious code as clean. The computing device 100 may use any reporting method; for example, the computing device 100 may generate an interactive alert, send a message or invoke a call or callback to at least one software module, generate a human readable report, add the suspicious code to a whitelist to allow future execution, or perform other security related tasks. After completion of block 326, the method 300 loops back to block 302 to identify suspicious code. In some embodiments, upon looping back to block 302 the computing device 100 may modify the context and environment of the transaction 206 and evaluate the behavior of the suspicious code in such changed conditions.

Figure 4:
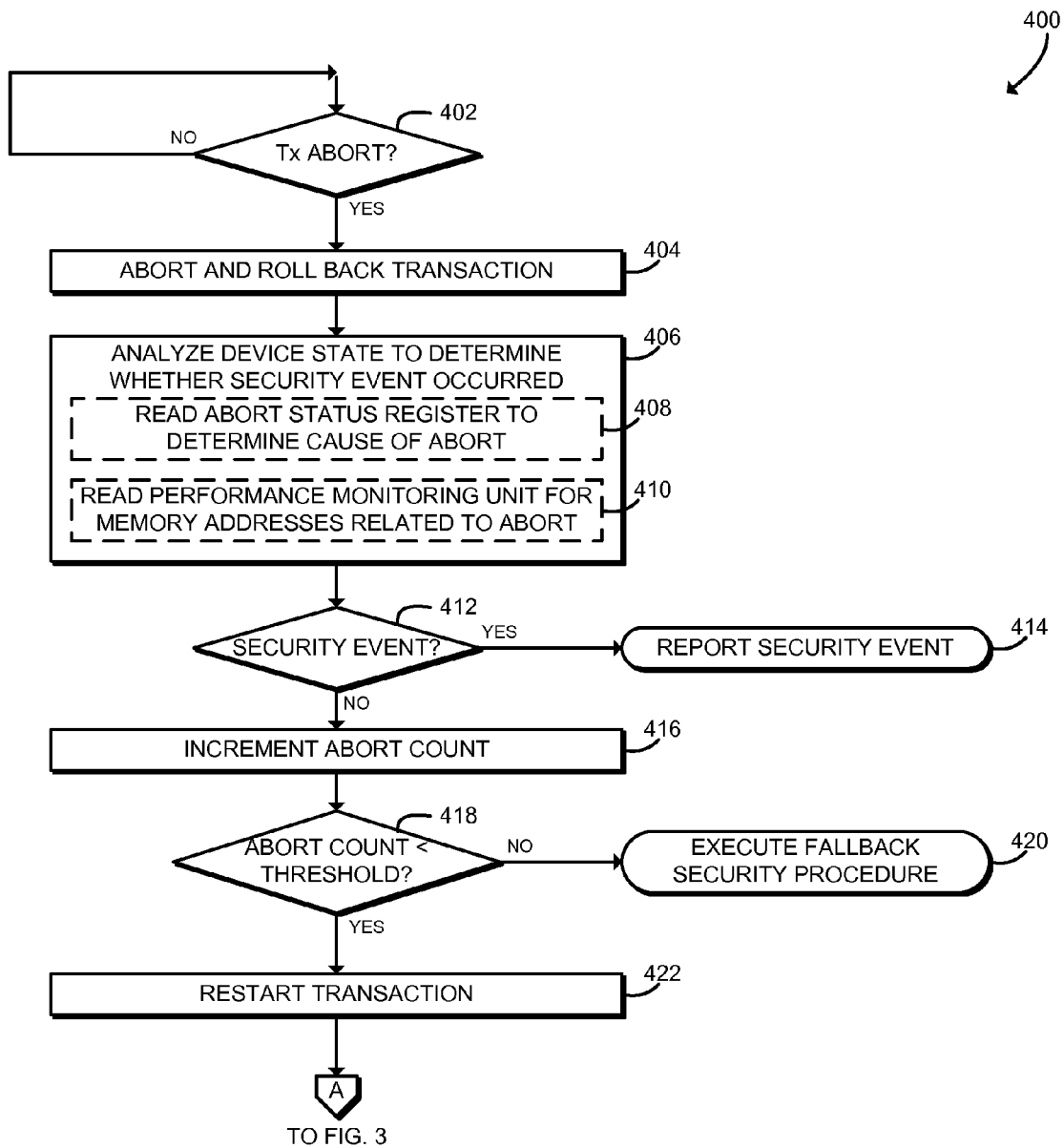
FIG. 4 is a simplified flow diagram of at least one embodiment of a method for detecting and handling transactional aborts that may be executed by the computing device of FIGS. 1 and 2.
Figure 5:
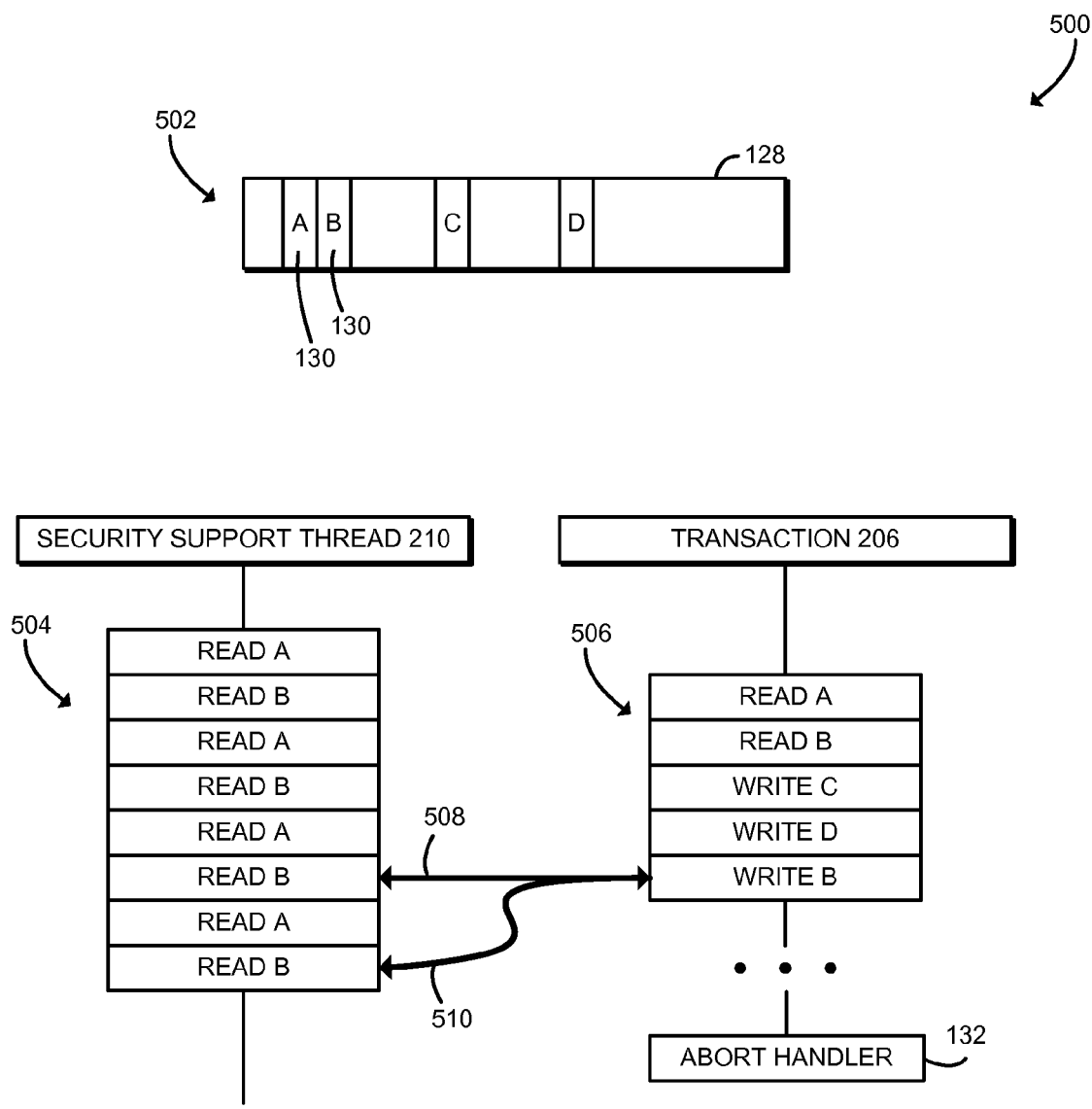
FIG. 5 is a schematic diagram illustrating potential data conflicts that may cause a transactional abort for the computing device of FIGS. 1 and 2.

Referring now to FIG. 4, in use, the computing device 100 may execute a method 400 for detecting and handling a transactional abort. The method 400 may be embodied, in part, as the abort handler 132 for the transaction 206. The method 400 begins in block 402, in which the computing device 100 determines whether a transactional abort should occur. In some embodiments, the process of block 402 may be executed for any instance of block 316 of FIG. 3, as described above. A transactional abort may be caused by a memory conflict between an active transaction and other transactions or threads executing on the computing device 100. For example, a transactional abort may be caused when suspicious code of the transaction 206 attempts to write to a memory location that has previously been read by the security support thread 210. Additionally or alternatively, as another example a transactional abort may be caused when the suspicious code of the transaction 206 writes to a memory location that is later read by the security support thread 210. The particular conditions causing a transactional abort may depend on the implementation of transactional memory support 122 of the processor 120. Additionally or alternatively, a transactional abort may be caused by an express abort instruction such as the XABORT instruction or by encountering a breakpoint. A transactional abort may also be caused by execution of an instruction not supported for transactional execution (e.g., certain vector math instructions or instructions with un-cached access to main memory), overflow of transactional hardware capacity, execution of an I/O operation, or other causes. The computing device 100 may detect the conditions triggering transactional aborts using any combination of hardware of the processor 120, microcode of the processor 120, firmware, or software. If no transactional abort should occur, the method 400 loops back to block 402 to continue monitoring for transactional aborts. If a transactional abort should occur, the method 400 advances to block 404. Although illustrated as a synchronous or polling-based process, it should be understood that in some embodiments detection of transactional aborts may be asynchronous or interrupt-driven.

In block 404, the computing device 100 aborts and rolls back the aborting transaction 206. The computing device 100 may use any appropriate technique to roll back the transaction 206. For example, in a write-caching transactional memory system, the computing device 100 may discard all cached data associated with the aborting transaction 206. As another example, in a write-in-place transactional memory system, the computing device 100 may restore original values of memory from a write log associated with the aborting transaction 206. The transaction 206 may be rolled back automatically by the processor 120, microcode of the processor 120, and/or platform firmware; that is, the rollback may occur transparently to any software executing on the computing device 100. After rolling back the transaction 206, the processor 120 may invoke the appropriate abort handler 132.

In block 406, the computing device 100 may analyze device state of the computing device 100 to determine whether a security event has occurred. This analysis may be performed by the abort handler 132 or otherwise invoked in response to the abort handler 132 being called. A security event includes any unauthorized access to one or more monitored memory regions 130. Thus, a security event may include, for example, an unauthorized attempt to modify a monitored memory region 130. Such unauthorized memory modifications may be attempted by malicious software such as rootkits attempting to hook the system table, patch the OS or security software, or subvert control of the computing device 100. As another example, a security event may include attempted execution of a prohibited location in memory such as the system stack, heap, a return-oriented programming (ROP) gadget, or a jump-oriented programming (JOP) gadget. Such unauthorized execution may be caused by a malicious attempt to execute arbitrary code. Security events may not include, for example, data conflicts not involving monitored memory regions 130, such as ordinary data conflicts between concurrently executing transactions and/or threads.

The computing device 100 may determine whether a security event has occurred based on the cause of the transactional abort. In block 408, in some embodiments the computing device 100 may read an abort status register to analyze the device state. For example, for Intel® architecture processors with Intel® TSX, the computing device 100 may read the EAX register. The abort status register may provide information on the reason for abort such as the memory conflict type, whether an explicit abort instruction was encountered, or whether a breakpoint was encountered. If the abort status register indicates a different cause for the transaction abort, then a security event may not have occurred. In some embodiments, in block 410 the computing device 100 may read the performance monitoring unit 124 to analyze the device (or processor) state. The PMU 124 may provide information to determine the cause of the transactional abort, including the memory addresses related to the abort, such as the address of the aborting instruction or the address of the conflicting data. For example, the computing device 100 may compare the memory address of the conflicting data with the memory addresses of the monitored memory regions 130 to determine whether the monitored memory regions 130 have been accessed. Thus, the computing device 100 may distinguish between a transactional abort caused by a security event and a transactional abort caused by a typical data conflict between concurrent transactions and/or threads. Additionally or alternatively, the computing device 100 may compare the memory address of the aborting instruction with the memory address of any breakpoints set within the suspicious code.

In block 412, the computing device 100 determines whether a security event has occurred. As described above, a security event may occur when the suspicious code writes or attempts to write to the monitored memory regions 130, or when the suspicious code executes or attempts to execute an unauthorized memory location. If a security event has occurred, the method 400 branches to block 414, in which the computing device 100 reports the security event. The security event may be reported using any available technique including displaying an interactive alert, generating a human readable report, blacklisting the suspicious code, quarantining or cleaning the suspicious code, blocking further execution of the suspicious code, or performing another security operation. After reporting the suspicious event, the computing device 100 may resume identifying suspicious code as shown in FIG. 3.

Referring back to block 412, if a security event has not occurred, the method 400 advances to block 416, in which the computing device 100 increments an abort count. The abort count is used to track the number of times the computing device 100 has attempted execution of the suspicious code, and may be used to ensure forward progress. The abort count may be embodied as any persistent counter associated with the particular suspicious code. In block 418, the computing device 100 determines whether the abort count is less than a predefined threshold abort count. The threshold abort count may be defined as a relatively small number of attempts, for example three attempts. If the abort count is greater than or equal to the threshold, the method 400 branches to block 420, in which the computing device 100 executes a non-transactional fallback security procedure. Persistent aborts may indicate that the suspicious code is deliberately constructed to evade detection via transaction conflict methods—this information may be used as a further suspicion for further analysis. For example, the computing device 100 may perform dynamic analysis of the suspicious code during execution. Such dynamic analysis is typically much slower than transactional execution; however, executing the fallback procedure may be relatively rare. After starting the fallback security procedure, the computing device 100 may resume identifying suspicious code as shown in FIG. 3.

Referring back to block 418, if the abort count is less than the threshold, the method 400 advances to block 422. In block 422, the computing device 100 restarts the transaction 206. Because the transaction 206 was aborted for reasons other than a security event, the transaction 206 may be successfully completed when reattempted. The computing device 100 may use any technique to restart the transaction 206. In the illustrative embodiment, execution of the computing device 100 jumps to blocks 314, 320 of method 300, as shown in FIG. 3. The computing device 100 then starts the security support thread 210 and the transaction 206 as described above.

EXAMPLES

Illustrative examples of the technologies disclosed herein are provided below. An embodiment of the technologies may include any one or more, and any combination of, the examples described below.

Example 1 includes a computing device for detecting unauthorized memory accesses, the computing device comprising a transactional execution module to (i) execute a code segment identified as suspicious and (ii) detect a transactional abort during execution of the code segment; and an abort handler module to (i) determine whether a security event has occurred in response to detecting the transactional abort, the security event indicative of an unauthorized memory access by the code segment to a monitored memory location and (ii) report the security event in response to determining that the security event has occurred.

Example 2 includes the subject matter of Example 1, and further including a security support module to execute a security support thread concurrently with execution of the code segment; and access, by the security support thread, the monitored memory location; wherein to detect the transactional abort comprises to detect a transactional abort caused by a transactional memory conflict related to a write to the monitored memory location.

Example 3 includes the subject matter of any of Examples 1 and 2, and wherein the monitored memory location comprises a code segment of an operating system of the computing device.

Example 4 includes the subject matter of any of Examples 1-3, and wherein to detect the transactional abort comprises to detect a conflict between a read instruction of the monitored memory location and a write instruction of the monitored memory location.

Example 5 includes the subject matter of any of Examples 1-4, and wherein the security support thread comprises the read instruction and the code segment comprises the write instruction.

Example 6 includes the subject matter of any of Examples 1-5, and wherein to determine whether the security event has occurred comprises to determine whether the transactional memory conflict was caused by an attempted write to the monitored memory location.

Example 7 includes the subject matter of any of Examples 1-6, and wherein to determine whether the transactional memory conflict was caused by the attempted write to the monitored memory location comprises to compare a first memory address of a conflicting data location retrieved from a performance monitoring unit of the computing device to a second memory address of the monitored memory location.

Example 8 includes the subject matter of any of Examples 1-7, and further including a security module to set a breakpoint within the code segment at the monitored memory location; wherein to detect the transactional abort comprises to detect the transactional abort in response to execution of the code segment reaching the breakpoint.

Example 9 includes the subject matter of any of Examples 1-8, and wherein to set the breakpoint comprises to insert a transactional abort instruction in the code segment.

Example 10 includes the subject matter of any of Examples 1-9, and wherein to determine whether the security event has occurred comprises to determine whether the transactional abort was caused by execution of the code segment reaching the breakpoint.

Example 11 includes the subject matter of any of Examples 1-10, and wherein to determine whether the transactional abort was caused by execution of the code segment reaching the breakpoint comprises to compare a first memory address of an aborting instruction to a second memory address of the breakpoint.

Example 12 includes the subject matter of any of Examples 1-11, and further including a security module to wrap the code segment in a transactional envelope; wherein to execute the code segment comprises to execute the code segment within the transactional envelope.

Example 13 includes the subject matter of any of Examples 1-12, and wherein to wrap the code segment comprises to insert a transaction begin instruction and a transaction end instruction in the code segment.

Example 14 includes the subject matter of any of Examples 1-13, and wherein the transactional execution module is further to complete execution of the code segment; and report the code segment as non-malicious in response to completion of the execution of the code segment.

Example 15 includes the subject matter of any of Examples 1-14, and wherein to complete execution of the code segment comprises to execute successfully a transaction end instruction.

Example 16 includes the subject matter of any of Examples 1-15, and wherein the abort handler module is further to (i) increment an abort count in response to a determination that the security event has not occurred and (ii) determine whether the abort count has a predetermined relationship to a threshold abort count; the computing device further comprises a fallback security module to execute a fallback security procedure in response to a determination that the abort count has the predetermined relationship to the threshold abort count, the fallback security procedure to analyze the code segment as a function of the abort count.

Example 17 includes a method for detecting unauthorized memory accesses, the method comprising executing, by a computing device, a code segment identified as suspicious; detecting, by the computing device, a transactional abort during execution of the code segment; determining, by the computing device, whether a security event has occurred in response to detecting the transactional abort, the security event indicative of an unauthorized memory access by the code segment to a monitored memory location; and reporting, by the computing device, the security event in response to determining the security event has occurred.

Example 18 includes the subject matter of Example 17, and further including executing, by the computing device, a security support thread concurrently with executing the code segment; and accessing, by the security support thread of the computing device, the monitored memory location; wherein detecting the transactional abort comprises detecting a transactional abort caused by a transactional memory conflict related to a write to the monitored memory location.

Example 19 includes the subject matter of any of Examples 17 and 18, and wherein the monitored memory location comprises a code segment of an operating system of the computing device.

Example 20 includes the subject matter of any of Examples 17-19, and wherein detecting the transactional abort comprises detecting a conflict between a read instruction of the monitored memory location and a write instruction of the monitored memory location.

Example 21 includes the subject matter of any of Examples 17-20, and wherein the security support thread comprises the read instruction and the code segment comprises the write instruction.

Example 22 includes the subject matter of any of Examples 17-21, and wherein determining whether the security event has occurred comprises determining whether the transactional memory conflict was caused by an attempted write to the monitored memory location.

Example 23 includes the subject matter of any of Examples 17-22, and wherein determining whether the transactional memory conflict was caused by the attempted write to the monitored memory location comprises comparing a first memory address of a conflicting data location retrieved from a performance monitoring unit of the computing device to a second memory address of the monitored memory location.

Example 24 includes the subject matter of any of Examples 17-23, and further including setting, by the computing device, a breakpoint within the code segment at the monitored memory location; wherein detecting the transactional abort comprises detecting the transactional abort in response to execution of the code segment reaching the breakpoint.

Example 25 includes the subject matter of any of Examples 17-24, and wherein setting the breakpoint comprises inserting a transactional abort instruction in the code segment.

Example 26 includes the subject matter of any of Examples 17-25, and wherein determining whether the security event has occurred comprises determining whether the transactional abort was caused by execution of the code segment reaching the breakpoint.

Example 27 includes the subject matter of any of Examples 17-26, and wherein determining whether the transactional abort was caused by execution of the code segment reaching the breakpoint comprises comparing a first memory address of an aborting instruction to a second memory address of the breakpoint.

Example 28 includes the subject matter of any of Examples 17-27, and further including wrapping, by the computing device, the code segment in a transactional envelope; wherein executing the code segment comprises executing the code segment within the transactional envelope.

Example 29 includes the subject matter of any of Examples 17-28, and wherein wrapping the code segment comprises inserting a transaction begin instruction and a transaction end instruction in the code segment.

Example 30 includes the subject matter of any of Examples 17-29, and further including completing, by the computing device, execution of the code segment; and reporting the code segment as non-malicious in response to completing the execution of the code segment.

Example 31 includes the subject matter of any of Examples 17-30, and wherein completing execution of the code segment comprises successfully executing a transaction end instruction.

Example 32 includes the subject matter of any of Examples 17-31, and further including incrementing, by the computing device, an abort count in response to determining the security event has not occurred; determining, by the computing device, whether the abort count has a predetermined relationship to a threshold abort count; and executing, by the computing device, a fallback security procedure in response to determining the abort count has the predetermined relationship to the threshold abort count, the fallback security procedure to analyze the code segment as a function of the abort count.

Example 33 includes a computing device comprising a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

The invention claimed is:

1. A computing device for detecting unauthorized memory accesses, the computing device comprising:
   a transactional execution module to (i) execute a code segment identified as suspicious and (ii) detect a transactional abort during execution of the code segment;
   a security support module to (i) execute a security support thread concurrently with execution of the code segment and (ii) access, via a read instruction by the security support thread, a monitored memory location; and
   an abort handler module to (i) determine whether a security event has occurred in response to detection of the transactional abort, the security event indicative of an unauthorized memory access by the code segment to the monitored memory location and (ii) report the security event in response to a determination that the security event has occurred,
   wherein to detect the transactional abort comprises to detect a transactional abort caused by a transactional memory conflict between the read instruction and a write instruction by the code segment to the monitored memory location.

2. The computing device of claim 1, wherein to determine whether the security event has occurred comprises to determine whether the transactional memory conflict was caused by an attempted write to the monitored memory location.

3. The computing device of claim 2, wherein to determine whether the transactional memory conflict was caused by the attempted write to the monitored memory location comprises to compare a first memory address of a conflicting data location retrieved from a performance monitoring unit of the computing device to a second memory address of the monitored memory location.

4. The computing device of claim 1, further comprising a security module to set a breakpoint within the code segment at the monitored memory location, wherein to set the breakpoint comprises to insert a transactional abort instruction in the code segment;
   wherein to detect the transactional abort comprises to detect the transactional abort in response to execution of the code segment reaching the breakpoint.

5. The computing device of claim 1, further comprising a security module to wrap the code segment in a transactional envelope;
   wherein to execute the code segment comprises to execute the code segment within the transactional envelope.

6. The computing device of claim 5, wherein to wrap the code segment comprises to insert a transaction begin instruction and a transaction end instruction in the code segment.

7. The computing device of claim 1, wherein:
   the abort handler module is further to (i) increment an abort count in response to a determination that the security event has not occurred and (ii) determine whether the abort count has a predetermined relationship to a threshold abort count;
   the computing device further comprises a fallback security module to execute a fallback security procedure in response to a determination that the abort count has the predetermined relationship to the threshold abort count, the fallback security procedure to analyze the code segment as a function of the abort count.

8. One or more non-transitory, computer-readable storage media comprising a plurality of instructions that in response to being executed cause a computing device to:
   execute a code segment identified as suspicious;
   execute a security support thread concurrently with execution of the code segment;
   access, via a read instruction by the security support thread, a monitored memory location;
   detect, during execution of the code segment, a transactional abort caused by a transactional memory conflict between the read instruction and a write instruction by the code segment to the monitored memory location;
   determine whether a security event has occurred in response to detecting the transactional abort, the security event indicative of an unauthorized memory access by the code segment to the monitored memory location; and
   report the security event in response to determining the security event has occurred.

9. The one or more non-transitory, computer-readable storage media of claim 8, wherein to determine whether the security event has occurred comprises to determine whether the transactional memory conflict was caused by an attempted write to the monitored memory location.

10. The one or more non-transitory, computer-readable storage media of claim 8, further comprising a plurality of instructions that in response to being executed cause the computing device to:
   set a breakpoint within the code segment at the monitored memory location, wherein to set the breakpoint comprises to insert a transactional abort instruction in the code segment;
   wherein to detect the transactional abort comprises to detect the transactional abort in response to execution of the code segment reaching the breakpoint.

11. The one or more non-transitory, computer-readable storage media of claim 8, further comprising a plurality of instructions that in response to being executed cause the computing device to wrap the code segment in a transactional envelope; wherein to execute the code segment comprises to execute the code segment within the transactional envelope.

12. A method for detecting unauthorized memory accesses, the method comprising:
   executing, by a computing device, a code segment identified as suspicious;
   executing, by the computing device, a security support thread concurrently with execution of the code segment;
   accessing, via a read instruction by the security support thread, a monitored memory location;
   detecting, by the computing device and during execution of the code segment, a transactional abort caused by a transactional memory conflict between the read instruction and a write instruction by the code segment to the monitored memory location;
   determining, by the computing device, whether a security event has occurred in response to detecting the transactional abort, the security event indicative of an unauthorized memory access by the code segment to the monitored memory location; and
   reporting, by the computing device, the security event in response to determining the security event has occurred.

13. The method of claim 12, wherein determining whether the security event has occurred comprises determining whether the transactional memory conflict was caused by an attempted write to the monitored memory location.

14. The method of claim 12, further comprising:
   setting, by the computing device, a breakpoint within the code segment at the monitored memory location, wherein setting the breakpoint comprises inserting a transactional abort instruction in the code segment;
   wherein detecting the transactional abort comprises detecting the transactional abort in response to execution of the code segment reaching the breakpoint.

15. The method of claim 12, further comprising wrapping, by the computing device, the code segment in a transactional envelope; wherein executing the code segment comprises executing the code segment within the transactional envelope.

* * * * *